United States Patent
Krebs et al.

(10) Patent No.: US 9,656,645 B2
(45) Date of Patent: May 23, 2017

(54) HYDRAULIC FLUID CONTAINER WITH BLOCKING DEVICE

(71) Applicant: Continental Teves AG & Co. oHG, Frankfurt (DE)

(72) Inventors: Werner Krebs, Hambach (DE); Stephan Schlicht, Nauheim (DE); David Sibr, Vrchlabi (CZ)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 14/784,388

(22) PCT Filed: Apr. 25, 2014

(86) PCT No.: PCT/EP2014/058487
§ 371 (c)(1),
(2) Date: Oct. 14, 2015

(87) PCT Pub. No.: WO2014/174092
PCT Pub. Date: Oct. 30, 2014

(65) Prior Publication Data
US 2016/0052497 A1     Feb. 25, 2016

(30) Foreign Application Priority Data

Apr. 26, 2013 (DE) .................. 10 2013 207 742

(51) Int. Cl.
  *B60T 11/26* (2006.01)
  *B60T 11/32* (2006.01)
  (Continued)

(52) U.S. Cl.
  CPC ............. *B60T 11/323* (2013.01); *B60T 11/22* (2013.01); *B60T 11/26* (2013.01); *B60T 17/04* (2013.01); *B60T 17/043* (2013.01); *B60T 17/06* (2013.01)

(58) Field of Classification Search
  CPC ........... B60T 11/22; B60T 11/26; B60T 11/32
  (Continued)

(56) References Cited

U.S. PATENT DOCUMENTS 4,934,144 A    6/1990 Larin
4,943,144 A *  7/1990 Delacourt .............. B82Y 20/00
                                               359/241
(Continued)

FOREIGN PATENT DOCUMENTS

DE         716384       1/1942
DE        3912110      10/1990
(Continued)

OTHER PUBLICATIONS

German Search Report for German Application No. 10 2014 207 839.3 mailed Jun. 6, 2014, including partial translation.
(Continued)

*Primary Examiner* — Christopher Schwartz
(74) *Attorney, Agent, or Firm* — RatnerPrestia

(57) ABSTRACT

A hydraulic fluid container for a hydraulic brake system, includes a hydraulic interface for connecting the hydraulic fluid container to another component. The hydraulic fluid container has a container housing, and the interface includes at least one connector arranged on the container housing, the connector received in a receiving seat of the other component. The connector has a channel which ensures a hydraulic connection between an interior of the container housing and the other component. A blocking device for blocking the hydraulic connection is provided, wherein the blocking device is opened when the connector is received in the receiving seat, the blocking device having a movable valve piston and a sealing element. The aim of the invention is to improve the blocking device and reduce the space requirement and assembly complexity. This is achieved in that the (Continued)

sealing element is designed to secure the position of the valve piston.

10 Claims, 2 Drawing Sheets

(51) Int. Cl.
*B60T 11/22* (2006.01)
*B60T 17/04* (2006.01)
*B60T 17/06* (2006.01)

(58) Field of Classification Search
USPC ........... 303/114.1; 188/151 R, 152, 358–360
See application file for complete search history.

(56) References Cited

U.S. PATENT DOCUMENTS 6,928,814 B2 * 8/2005 Lange .................... B60T 11/26
60/585
7,299,631 B2 * 11/2007 Bourlon ................. B60T 17/06
60/585

FOREIGN PATENT DOCUMENTS

| DE | 10135793 | 4/2003 |
| FR | 2872759 | 1/2006 |
| GB | 2230831 | 10/1990 |

OTHER PUBLICATIONS

International Search Report for International Application No. PCT/EP2014/058487 mailed Jul. 6, 2015.

* cited by examiner

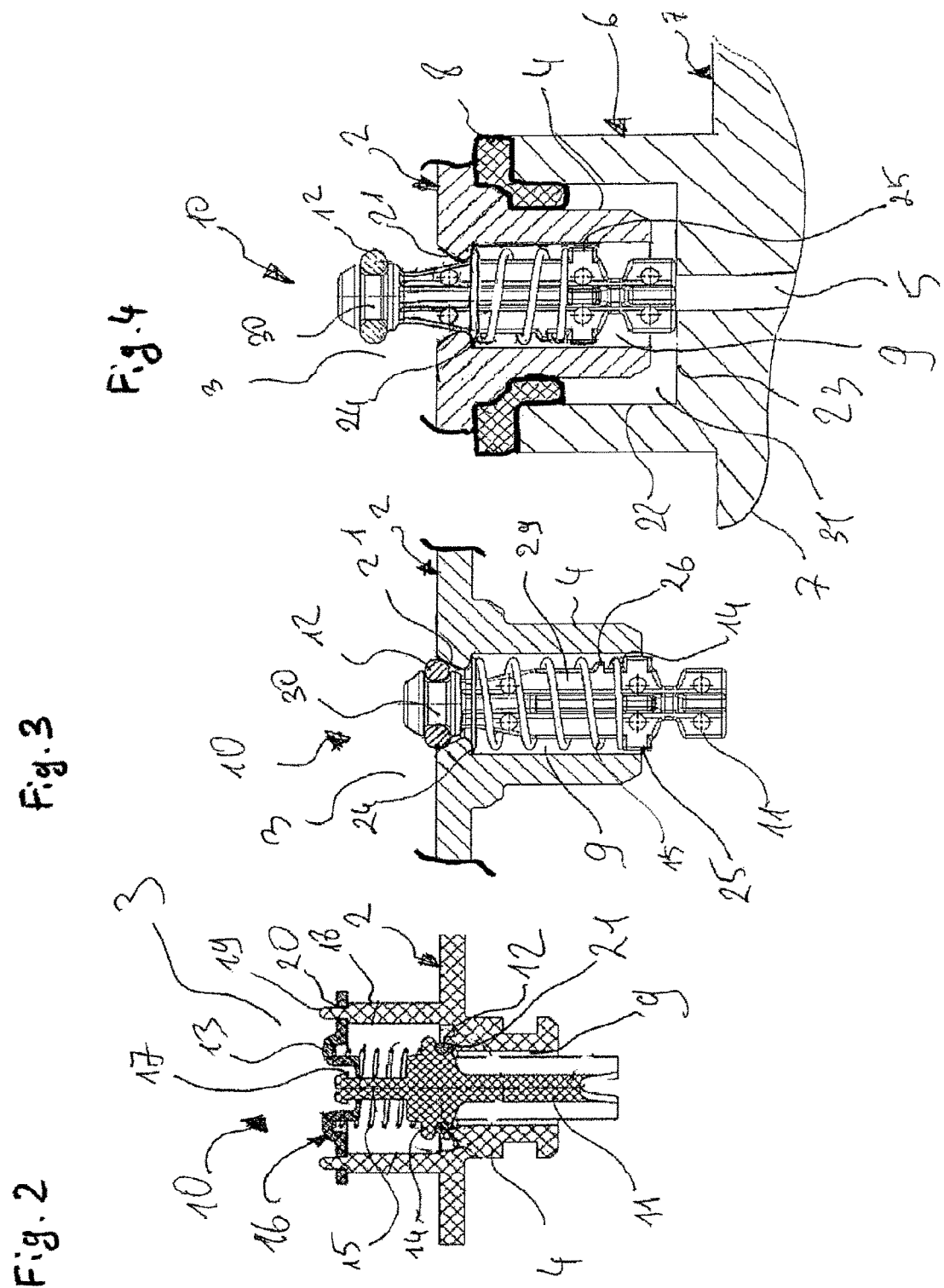

HYDRAULIC FLUID CONTAINER WITH BLOCKING DEVICE

CROSS REFERENCE TO RELATED APPLICATIONS

This application is the U.S. National Phase Application of PCT/EP2014/058487, filed Apr. 25, 2014, which claims priority to German Patent Application No. 10 2013 207 742.4, filed Apr. 26, 2013, the contents of such applications being incorporated by reference herein.

BACKGROUND OF THE INVENTION

Known hydraulic car brake systems often have pressurizing medium containers which ensure a supply of pressurizing medium to a main brake cylinder or an actuator. Such pressurizing medium containers are often arranged directly on a main brake cylinder and the supply of pressurizing medium is carried out through connecting pieces which are formed on the pressurizing medium container and are introduced in a sealing manner into receiving seats of the main brake cylinder.

In the event of a pronounced action of force on the pressurizing medium container, for example, as a result of an accident, it can occur that the pressurizing medium container is lifted up from the main brake cylinder. In order, in such a case, to prevent an escape of the pressurizing medium, which could ignite on hot parts in the engine compartment, out of the pressurizing medium container, it is known to provide shut-off devices which automatically shut off the hydraulic connection through the connecting pieces of the pressurizing medium container.

For example, shut-off devices are known which have a premounted valve unit which is introduced into an inner space of the pressurizing medium container during production of the pressurizing medium container and irreversibly detachably fastened by hot shaping of separate fixing pins.

Complexity in structure and mounting, a large space requirement for mounting tools and the need for additional construction elements for bearing and fixing the valve unit within the container housing are regarded as disadvantageous.

SUMMARY OF THE INVENTION

An aspect of the present invention is therefore to offer an improved pressurizing medium container with a shut-off device which has a smaller space requirement and can be produced and mounted more easily and at lower cost in comparison to the prior art and can be integrated with little outlay into the existing pressurizing medium container devices.

According to an aspect of the invention a sealing element can be formed to secure the position of the valve piston 11. It thus advantageously serves simultaneously as a seal, a stop and for receiving closing forces in the case of a closed state of the shut-off device. Separate elements for fixing the shut-off device in the pressurizing medium container during transport, storage, mounting and operation can be omitted, as well as additional transport protection caps for connecting pieces as contamination protection.

One region of the valve piston between the stop and the sealing element can advantageously be embodied to be under tensile stress in the closed state of the shut-off device.

The shut-off device can thus be configured such that it has a smaller design and is lower cost in comparison to the known design because it has fewer components, can be mounted by the connecting piece and can be fixed without hot shaping or gluing, solely by mounting the sealing element.

In a further development of the invention, such a shut-off device can be arranged almost entirely directly in the channel of the connecting piece of a pressurizing medium container according to the invention. As a result of this, the shut-off device according to the invention can be used in almost any existing pressurizing medium container without larger tool changes solely by virtue of the fact that an embodiment of the shut-off device adapted to the channel of the connecting piece is provided and where applicable a valve seat is adapted to bear the sealing element.

BRIEF DESCRIPTION OF THE FIGURES

Further details, features, advantages and possible applications of the invention are apparent from subordinate claims together with the description on the basis of the drawings. Matching components and construction elements are where possible provided with the same reference numbers. Below:

FIG. 2 shows a known embodiment of a shut-off device in a sectional representation.

FIG. 3 shows an embodiment according to the invention of a shut-off device in the closed state in a sectional representation.

FIG. 4 shows the embodiment according to the invention of a shut-off device according to FIG. 3 in an opened state with the connecting piece introduced into a receiving seat of the main brake cylinder.

DETAILED DESCRIPTION OF THE PREFERRED EMBODIMENTS

FIG. 1

Figure 1:
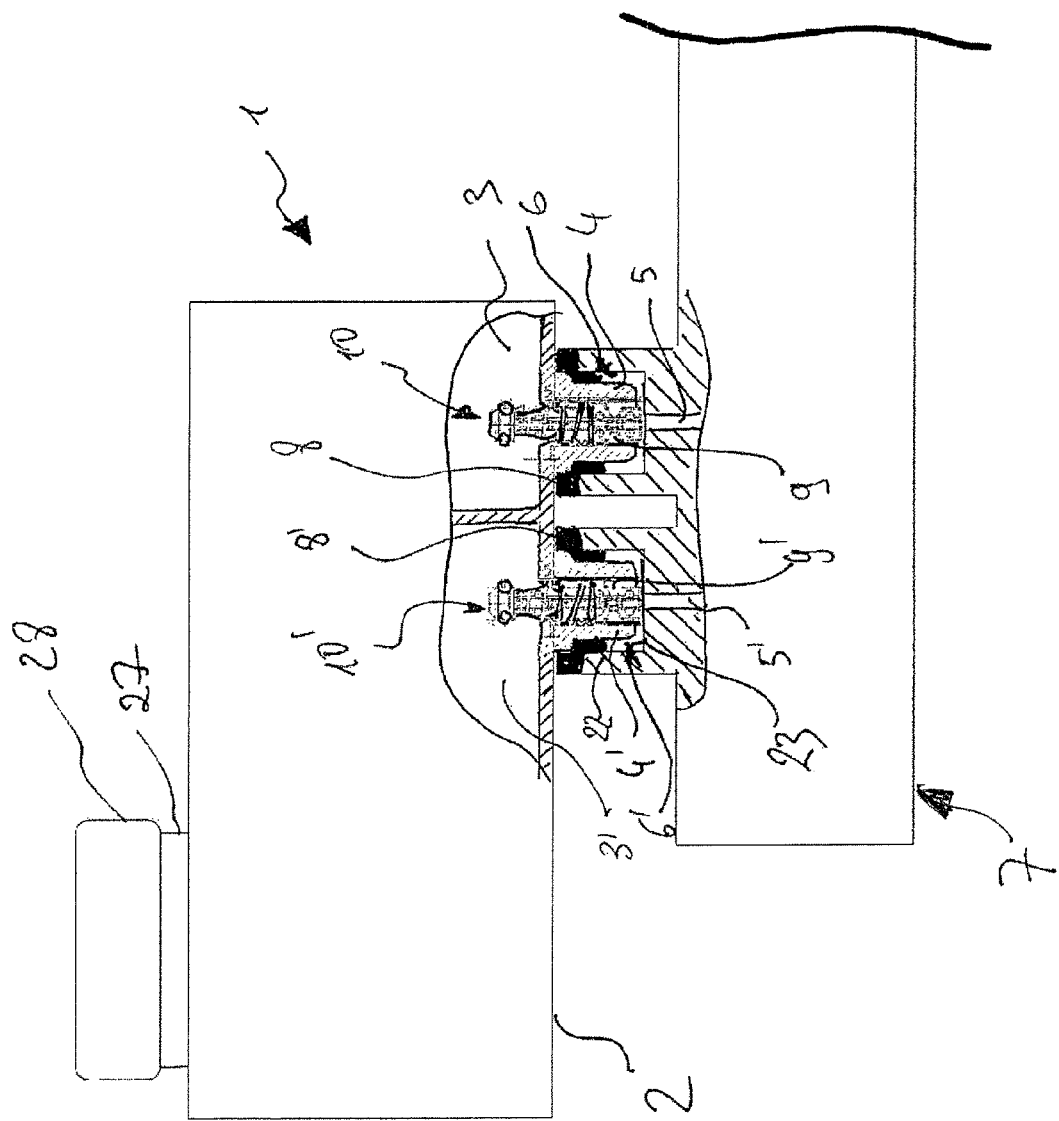
FIG. 1 shows an embodiment according to the invention of a pressurizing medium container mounted on a tandem main brake cylinder, with two shut-off devices in the opened state.

A pressurizing medium container 1 has a container housing 2, the inner space of which has two pressurizing medium chambers 3, 3' which contain a liquid pressurizing medium. A filling connecting piece 27 is provided for filling pressurizing medium container 1 with pressurizing medium, which filling connecting piece 27 is closed with a closure cap 28. Two connecting pieces 4, 4' are formed on container housing 2, which connecting pieces 4, 4' are arranged in receiving seats 6, 6' of a tandem main brake cylinder 7 and are fixed and sealed off from the surroundings by means of seals 8, 8'. Receiving seats 6, 6' are formed to be cup-shaped with in each case one wall 22 and one base 23. Inner channels 9, 9' of connecting pieces 4, 4' enable a hydraulic connection between respective pressurizing medium chamber 3, 3' and downstream channels 5, 5' which themselves are hydraulically connected to pressure chambers, not shown, inside main brake cylinder 7. Two shut-off devices 10, 10' are arranged in connecting pieces 4, 4' and are located in an opened state in which there is the hydraulic connection between pressurizing medium chambers 3, 3' and downstream channels 5, 5' and the hydraulic connection is not interrupted.

FIG. 2

FIG. 2 shows a known embodiment of a shut-off device 10. It has a valve unit 16 which comprises a valve piston 11, a sealing element 12 arranged on valve piston 11, a holding disk 13 and a spring element 15 clamped between holding disk 13 and a stop 14 and is arranged substantially within pressurizing medium chamber 3 apart from a part of valve piston 11. A disk stop 17 prevents holding disk 13 from being guided away from valve piston 11. Sealing element 12 is pushed by spring element 15 supported indirectly via holding disk 13 on container housing 2 against a valve seat 21.

For mounting in container housing 5, valve unit 16 is initially premounted, then introduced into container housing 2 and out of the inner space of container housing 2 into channel 9 of connecting piece 4, on which bearing seats 18 are arranged so that fixing pins 19 protrude through openings 20 of the holding disk and are subsequently fixed irreversibly in container housing 2 by melting of fixing pins 19. Sealing element 12 is pushed by the prestressing force of spring element 15 against a valve seat 21. If pressurizing medium container 1 is introduced with connecting piece 4 into a receiving seat 6, base 23 of receiving seat 6 pushes valve piston 11 upwards so that sealing element 12 lifts off from valve seat 21 and releases the hydraulic connection through channel 9.

FIG. 3

FIG. 3 shows an embodiment according to an aspect of the invention of a shut-off device 10. In contrast to the known prior art described in FIG. 2, the device according to the invention is arranged almost entirely in channel 9 of connecting piece 4 so that only one end of valve piston 11 protrudes with sealing element 12 into pressurizing medium chamber 3 within container housing 2.

Sealing element 12 is arranged in a circumferential groove 30 at the end protruding into pressurizing medium chamber 3 and serves, when it bears against valve seat 21, not only to prevent the hydraulic connection through channel 9, rather simultaneously to secure the position of valve piston 11 and thus of entire shut-off device 10 in container housing 2. No further separate securing elements are thus required for fastening shut-off device 10 in pressurizing medium container 1.

It is furthermore clearly apparent that, in contrast to the known prior art described above, sealing element 12 of shut-off device 10 according to an aspect of the invention is pulled by spring element 15 supported directly on container housing 2 against valve seat 21. Because spring element 15 is arranged in a prestressed manner between stop 14 on valve piston 11 and collar 24 which protrudes below valve seat 21 into channel 9, valve piston 11 in the shown closed state of shut-off device 10 is put under tensile stress in the region between stop 14 and sealing element 12.

Valve piston 11 has in its region between groove 30 and its end facing away from sealing element 12 a substantially cruciform cross-section which is formed by four ribs 29. Cavities between ribs 29 serve to have the pressurizing medium flow through channel 9, past and along valve piston 11. It will be obvious that a number other than four of ribs 29 is also permissible within the invention, and the cross-sectional profile of valve piston 11 can also be star-shaped, quadratic, polygonal, oval or also round with introduced longitudinal grooves or have a combination of the above profiles without departing from the invention.

Ribs 29 furthermore have projections 25 which are formed such that they project beyond the outer diameter of spring element 15, serve to guide and center valve piston 11 in channel 9.

A securing element 26, which can be arranged as represented on only one or on several ribs 29 or at a different point on the body of valve piston 11, serves as a securing device for spring element 15 during transport, mounting or in other handling operations. However, such a securing element 26 can also be omitted within the invention.

FIG. 4

FIG. 4 shows a cut-out of container housing 2 in the mounted state if connecting piece 4 is arranged in receiving seat 6 and is sealed off from the surroundings of pressurizing medium container 1 as well as guided and held by seal 8.

Receiving seat 6 is formed in the example shown on a main brake cylinder 7 in accordance with FIG. 1, but can also be arranged within the invention on any desired assembly or on a connection line. Represented receiving seat 6 is formed to be substantially cup-shaped with a wall 22 and a base 23 and has a downstream channel 5 which enables a hydraulic connection between inner region 31 of receiving seat 6 and a further inner space, not shown, within the brake system.

Valve piston 11 is supported on the base of receiving seat 6 with one end so that its other end remains pushed into pressurizing medium chamber 3, sealing element 12 is lifted off from the valve seat and an exchange of pressurizing medium between pressurizing medium chamber 3 and inner region 31 of receiving seat 6 and thus a further inner space, not shown, within the brake system is possible.

If pressurizing medium container 1 is displaced by a pronounced action of force, for example, as a result of an accident, such that connecting piece 4 is moved out of receiving seat 6, valve piston 11 is no longer supported by base 23 and moved by the prestressing force of spring element 15 in the direction of the surroundings so that sealing element 12 comes to rest in a sealing manner on valve seat 21 and the hydraulic connection between pressurizing medium chamber 3 and the channel and thus the throughflow though channel 9 is shut off.

The represented position of valve piston 11 in an open state of shut-off device 10 also substantially corresponds to a mounting position during installation of shut-off device 10 in container housing 2. During the mounting process, spring element 15 is initially pushed onto valve piston 11 and with at least one turn over securing element 26 and secured against loss by the latching of the turn in a region between securing element 26 and stop 14. The premounted constructional unit formed from valve piston 11 and spring element 15 is pushed from the outside into channel 9 of connecting piece 4 in the direction of pressurizing medium chamber 3 until the end of valve piston 11 protrudes with groove 30 so far into the inside of container housing 2 that sealing element 12 can be introduced into groove 30. Spring element 15 is also prestressed between stop 14 and collar 24. Valve piston 11 is held in the described position until sealing element 12 is latched in groove 30 and thereafter is relieved or released again. Valve piston 11 with sealing element 12 now mounted thereon is then moved back by spring element 15 until sealing element 12 comes to rest on valve seat 21 and is pressed on. As a result of this, the shut-off function of shut-off device 10 and the securing of its position are achieved simultaneously by sealing element 12.

REFERENCE NUMBERS

1 Pressurizing medium container
2 Container housing

3 Pressurizing medium chambers
4 Connecting piece
5 Downstream channel
6 Receiving seat
7 Main brake cylinder
8 Seal
9 Channel
10 Shut-off device
11 Valve piston
12 Sealing element
13 Holding disk
14 Stop
15 Spring element
16 Valve unit
17 Disk stop
18 Bearing seat
19 Fixing pin
20 Opening
21 Valve seat
22 Wall
23 Base
24 Collar
25 Projection
26 Securing element
27 Filling connecting piece
28 Closure cap
29 Rib
30 Groove
31 Inner region

The invention claimed is:

1. A pressurizing medium container for a hydraulic brake system with a hydraulic interface for connection of the pressurizing medium container to a different component, wherein the pressurizing medium container has a container housing, the interface comprises at least one connecting piece arranged on the container housing, which connecting piece is received in a receiving seat of the other component, the connecting piece has a channel which ensures a hydraulic connection between an inner space of the container housing and the other component, wherein a shut-off device is provided for shutting off the hydraulic connection which is opened if the connecting piece is received in the receiving seat, wherein the shut-off device has a displaceable valve piston and a sealing element, wherein the sealing element is formed to secure the position of the valve piston, and wherein at least one region of the valve piston is under tensile stress in an axial direction of the valve piston in a closed state of the shut-off device.

2. The pressurizing medium container as claimed in claim 1, wherein the sealing element is received by the valve piston and is pressed against a valve seat if the connecting piece is not received in the receiving seat.

3. The pressurizing medium container as claimed in claim 2, wherein the valve piston has a stop and a spring element is arranged in an elastically prestressed manner between the stop and an element, fixed on the housing, of the container housing.

4. The pressurizing medium container as claimed in claim 3, wherein the spring element is arranged in the channel.

5. The pressurizing medium container as claimed in claim 1, wherein the sealing element is formed as an O-ring.

6. The pressurizing medium container as claimed in claim 1, wherein the other component is a main brake cylinder.

7. The pressurizing medium container as claimed in claim 1, wherein the other component is a rigid or flexible line connection between a main brake cylinder and the pressurizing medium container.

8. A method for mounting a shut-off device in the pressurizing medium container with the features as claimed in claim 1, the method comprising:
pushing a spring element onto the valve piston,
inserting the valve piston with the spring element pushed thereon into the channel in the direction of the inner space of the container housing with build-up of a prestressing of the spring element by loading an end of the valve piston opposite the inner space of the container housing until the other end of the valve piston protrudes into the inner space of the container housing,
maintaining the position of the valve piston reached in the above step,
mounting the sealing element on the valve piston, and
relieving the valve piston.

9. A method for mounting a pressurizing medium container with the features as claimed in claim 1 on the different component, wherein the shut-off device is opened by a pairing of the pressurizing medium container with the different component.

10. A pressurizing medium container for a hydraulic brake system with a hydraulic interface for connection of the pressurizing medium container to a different component, wherein the pressurizing medium container has a container housing, the interface comprises at least one connecting piece arranged on the container housing, which connecting piece is received in a receiving seat of the other component, the connecting piece has a channel which ensures a hydraulic connection between an inner space of the container housing and the other component, wherein a shut-off device is provided for shutting off the hydraulic connection which is opened if the connecting piece is received in the receiving seat, wherein the shut-off device has a displaceable valve piston and a sealing element, and wherein the sealing element is formed to secure the position of the valve piston, wherein a spring element is arranged in a prestressed manner between a stop surface provided on the container housing and a collar formed on the valve piston, and wherein the collar is separate from the sealing element and protrudes radially outward from the valve piston into the channel.

* * * * *